Sept. 27, 1932.   J. J. MUNDORF   1,879,706

AUTOMATIC CONTROLLING MEANS FOR HEATING SYSTEMS

Filed July 13, 1931   3 Sheets-Sheet 1

James J. Mundorf INVENTOR

BY Victor J. Evans
and Co. ATTORNEY

Sept. 27, 1932.  J. J. MUNDORF  1,879,706
AUTOMATIC CONTROLLING MEANS FOR HEATING SYSTEMS
Filed July 13, 1931  3 Sheets-Sheet 2
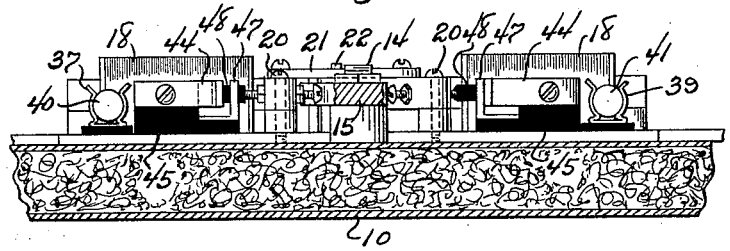
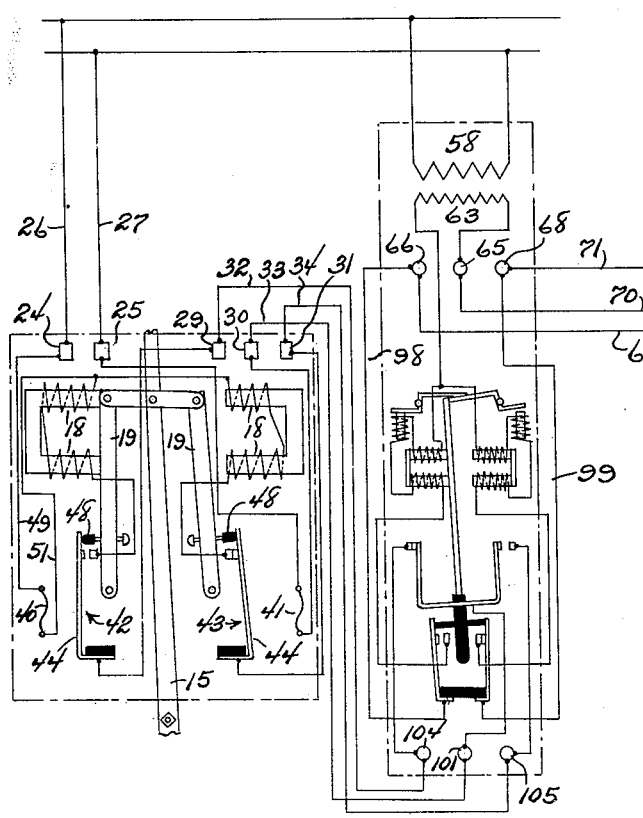
James J. Mundorf
INVENTOR
BY Victor J. Evans
and Co. ATTORNEY

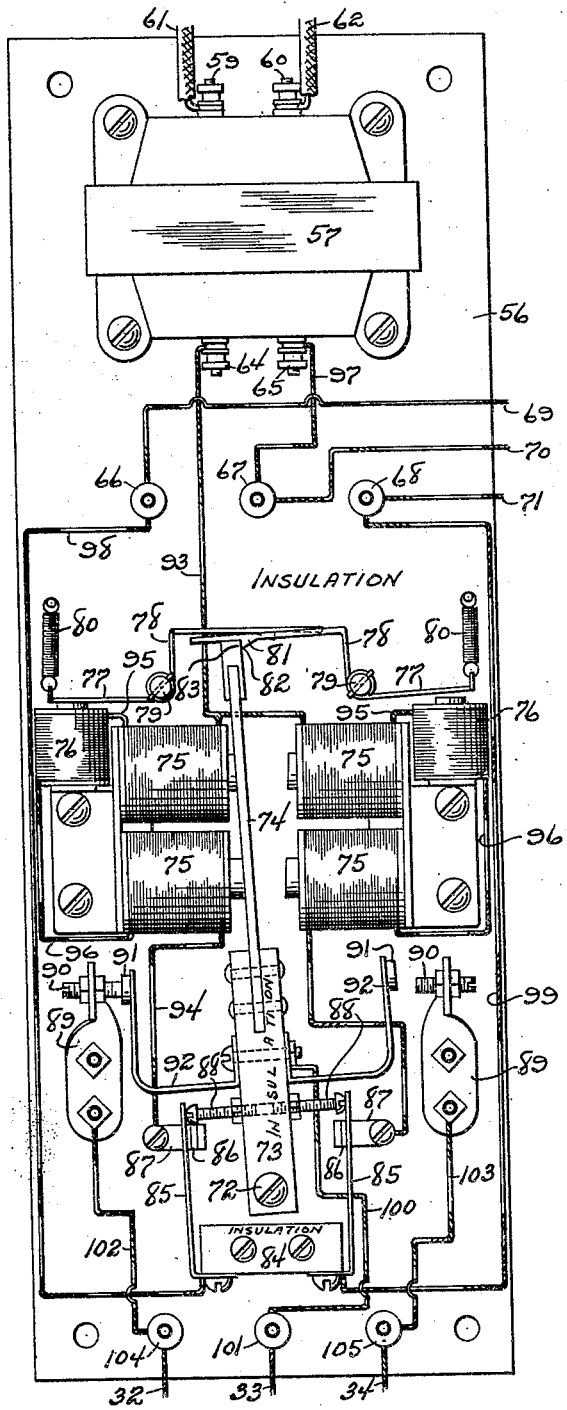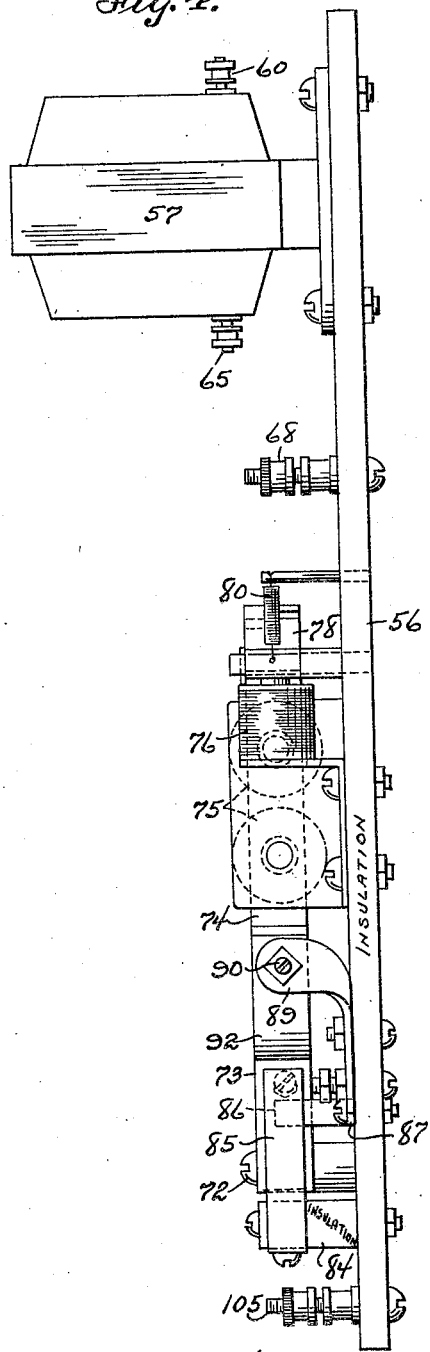

Patented Sept. 27, 1932

1,879,706

UNITED STATES PATENT OFFICE

JAMES J. MUNDORF, OF SHARON, PENNSYLVANIA, ASSIGNOR, BY DIRECT AND MESNE ASSIGNMENTS, TO MUNDORF HEATING SYSTEMS COMPANY, OF SHARON, PENNSYLVANIA, A CORPORATION OF PENNSYLVANIA

AUTOMATIC CONTROLLING MEANS FOR HEATING SYSTEMS

Application filed July 13, 1931. Serial No. 550,563.

The invention relates to heating system and apparatus and has for its general object the provision of a novel electrically operated automatic controlling means adapted to be used for the purpose of operating or controlling the position of a damper, shutter, control valve, or in fact any other element forming part of a heating system and apparatus in general or a local device such as a radiator located within a room or other place.

An important object of the invention is to provide an electrically operated control means responsive to a room thermostat and acting as a relay for controlling a sufficiently heavy current to operate a motor or an electro-magnetic device which actuates the local control means such as the damper, shutter or the like.

Another important object of the invention is to provide an electrically operated control means well adapted for use in connection with the heating system or apparatus disclosed in my copending application for patent filed February 16, 1931 and given Serial No. 516,137 though the present device is not in any way limited for use in association with such a mechanism as it is capable of a much wider application or use.

A more specific object is to provide a control device operated entirely from a lighting circuit of say 110 volts and an embodying means whereby a transformer is utilized for providing a light current which passes through the room thermostat and which operates switches or contact devices for controlling the passage of heavier current through the electro-magnetic or other controlled device for actuating the damper, shutter or other control elements of the heating mechanism.

The invention further contemplates the provision of an automatic thermostatic controlled relay device in which the various parts, circuit breakers and the like, will operate positively and will be of sufficiently rugged character to withstand prolonged use.

An additional object is to provide an apparatus of this character which will be simple and inexpensive to make, easy to install, positive and automatic in operation, efficient and durable in service and a general improvement in the art.

To the attainment of the foregoing and other objects and advantages, the invention preferably consists in the details of construction and the arrangement and combination of parts to be hereinafter more fully described and claimed and illustrated in the accompany drawings in which:—

Figure 1 is a front elevation of the electro-magnetically operating means for shifting a shutter or the like.

Figure 2 is an end elevation thereof with the operating lever in section.

Figure 3 is a front elevation of the relay device.

Figure 4 is a side elevation thereof.

Figure 5 is a diagrammatic view showing the complete apparatus.

Figure 1:
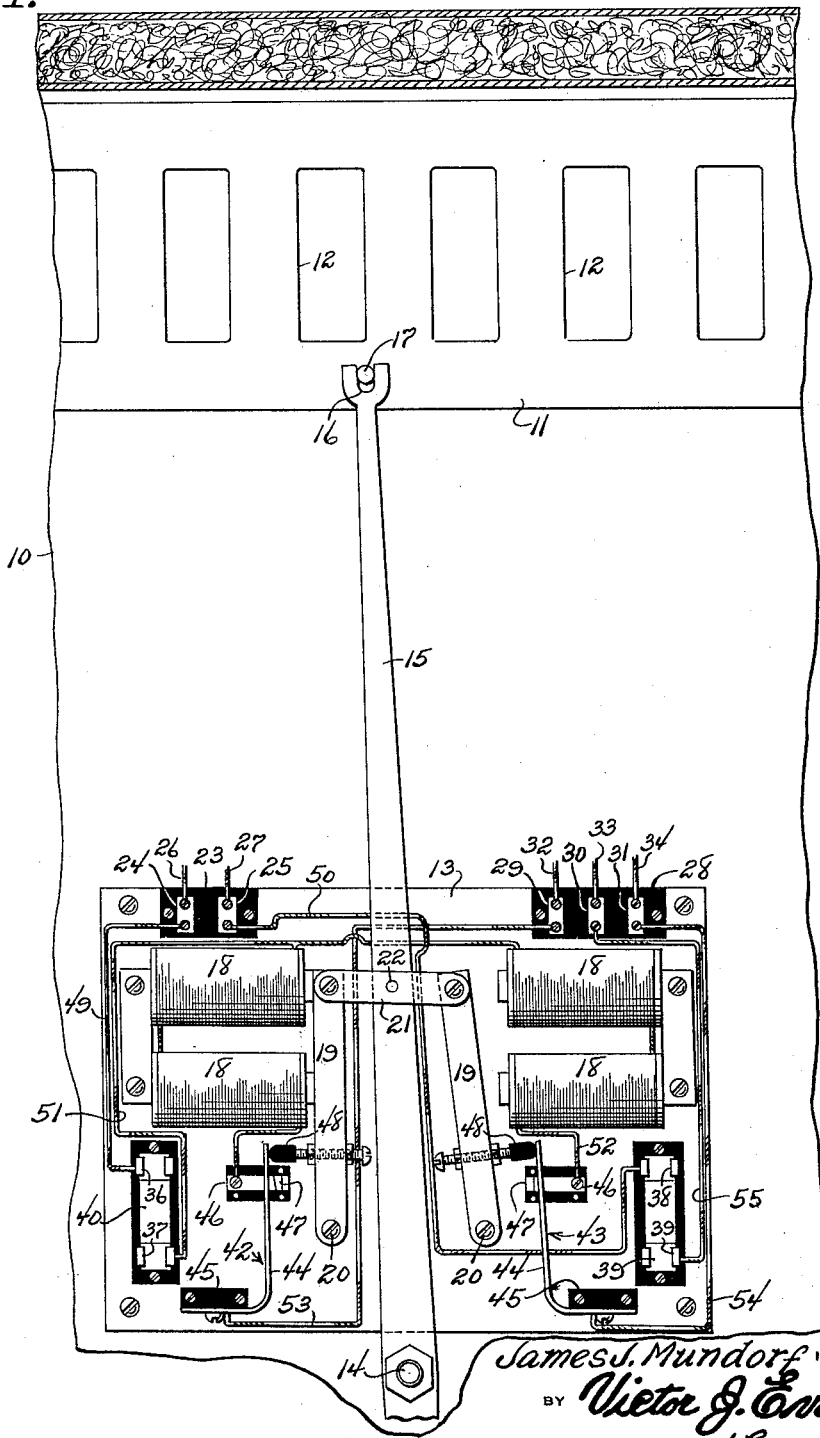

Referring more particularly to the drawings, and especially Figure 1 the numeral 10 designates a portion of a casing which may surround a radiator or other heating device, not shown and which is provided with openings adapted to be closed to a greater or less extent by a register plate 11 slidably mounted and formed with openings 12 adapted to register with the opening in the casing, for instance in the manner as set forth in the copending application above referred to. Clearly if there be a radiator enclosed within a casing the opening and closing of a registered device will operate to control the heating effect of a radiator.

The means for controlling the position of the register plate 11 is disclosed in detail in Figures 1 and 2 and diagrammatically in Figure 5, and is represented as comprising a base plate 13 upon which is pivoted at 14 a lever arm 15 terminating in a fork 16 engaging a pin or the like 17 of the register plate 11. It will be observed that no precise detail of construction of the register plate and its mounting are given as reference may be had to the copending application and as it is readily conceivable that some other type of control means could be utilized to the same advantage. The means for shifting the position of the lever 15 comprises pairs of the electromagnets 18 mounted on the base plate 13 at opposite sides of the lever 15 and adapted to attract to themselves armatures 19 pivoted at 20 upon the base plate and having their free ends pivotally connected with each other by a bridle or bridge member 21, which is in turn pivotally connected at 22 with the lever 15. Obviously when one armature 19 is attracted by one pair of electro-magnets the lever 15 will be moved in one direction and when the other armature is attracted by the other pair of electro-magnets the lever 15 will be moved in the other direction. Mounted upon the base plate 13 and insulated therefrom by suitable dielectric material 23 are terminal members 24 and 25 to which are connected the conductors 26 and 27 of an electric lighting system or house current. The insulating material 23 and the terminal blocks 24 and 25 are preferably mounted at one side of the lever. Carried by the base plate 13 at the other side of the lever is a similar block of insulating material 28 upon which are mounted terminals 29, 30 and 31 with which are connected conductors 32, 33 and 34, respectively connected with the relay device to be hereinafter described.

Secured upon the base plate 13 are block members of insulating material, one carrying clips 36 and 37 and the other carrying similar clips 38 and 39, the respective pairs of clips constituting retaining means for fuses 40 and 41.

I also provide switches or contact devices operated by movement of the armatures 19. These circuit breakers or contact devices are of similar construction and are indicated as a whole by the numerals 42 and 43, each including a spring arm 44 carried at one end by an insulating block 45 and having its other end spaced from a metallic contact 46 over which it is movable, the free end of the arm being adapted to engage a laterally extended end 47 of the contact 46 under certain conditions.

Each armature 19 carries a screw adjusted contact 48 projecting from the side thereof and adapted to engage the free end of the adjacent spring arm 44 for moving the same into or out of engagement with the lateral end 47 of the contact 46.

The terminal block 24 is connected by a conductor 49 with the clip 36 while the terminal 25 is connected by a conductor 50 with the fuse clip 38. Connected with the clip 37 is a conductor 51 which is branched and which leads to one terminal of each pair of electro-magnets 18, each pair of which are connected in series. The other terminals of the pairs of electro-magnets are connected by conductors 52 with the respective contact 46. The contact 44 of the circuit breaker 42 is connected by a conductor 53 with the terminal 29 and the contact 44 of the circuit breaker 43 is connected by a conductor 54 with the terminal 31. The fuse clip 39 has connected therewith a conductor 55 which is connected with the central terminal 30. The above constitutes the local operating means for the shutter or register plate 11 or any other equivalent device.

The relay device used in association with this electro-magnetic operating device is shown in detail in Figures 3 and 4 and diagrammatically in Figure 5 and may be located at any desired point, that is to say either close to the electro-magnetic device or at some appreciable distance therefrom, this being immaterial. This relay device is shown as comprising a base plate or supporting panel 56 upon which is mounted a step down transformer 57 having a primary coil 58 connected with terminals 59 and 60 to which are connected conductors 61 and 62 connected with the electric lighting system. The transformer 57 has also a secondary coil 63, the terminals of which are brought out to binding posts 64 and 65 connected in the circuit to be hereinafter described. Also mounted upon the panel 56 are terminal posts 66, 67 and 68 with which are connected conductors 69, 70 and 71 which lead to a thermostat device to be described.

Pivoted at 72 upon the panel 56 is a supporting member 73 of insulating material carrying an armature arm 74 at opposite sides of which are located electro-magnets 75 positioned to attract the armature arm 74 and move it in one direction or the other as the case may be. Also mounted on the panel 56 and connected in series with the respective electro-magnets 75 are other electro-magnets 76 located preferably at right angles to the electro-magnets 75 and positioned to attract armatures 77 forming part of latch arms 78 pivoted at 79 on the panel. Springs 80 or other similar tension devices are connected with the free ends of the armatures 77 for the purpose of normally urging them away from the cores of the electro-magnets 76. Each latch arm 78 carries a keeper 81 having an inclined face 82 leading to a shoulder 83, these keepers cooperating with the free end of the armature arm 74 for the purpose of holding the same at one limit of its movement or the other depending upon which electro-magnet 75 is energized.

I also provide means for breaking the circuit through the electro-magnets 75 and 76, the latter being connected in series with the former, said means comprising a support 84 of insulating material mounted on the panel 56 and carrying a pair of spring contacts 85 adapted to engage lateral extensions 86 on stationary contact 87 likewise mounted on the panel, the free ends of the spring arms 85 projecting beyond the lateral extensions 86 and being adapted to be engaged by the ends of screws 88 which are adjustably mounted upon the movable supporting member 73, it being clear that when the member 73 is swung in one direction one screw 88 will engage the free end of one contact 85 and move it out of engagement with the lateral projection 86 on the contact 87. This is taken advantage of in a manner which will be explained in the operation.

The mechanism thus far described in connection with Figures 3 and 4 is provided for the purpose of controlling a much heavier current than could possibly be taken care of by the room thermostat to be described and this mechanism therefore operates a switch device here disclosed in detail and comprising the parts to be described. This switch device includes a pair of stationary contacts 89 mounted upon the panel 56 and carrying adjustable contact elements 90, preferably of a screw type, adapted to be engaged by contacts 91 on the free ends of spring arms 92 secured to the insulating member 73, the arrangement being such that when one contact 90 is engaged by one contact 91, the others will be disengaged in a manner to be explained more fully hereinafter.

The electrical connections for this portion of apparatus are as follows: Connected with the terminal post 64 of the transformer 57, that is to say with the secondary coil 63 thereof, is a conductor 93 which is branched and which connects with both of the electro-magnets 75, the other terminals of which are connected by conductors 94 with the contact 87. As mentioned above the electro-magnets 76 are connected in parallel with the electromagnets 75 by means of conductors 95 and 96. The terminal post 65 of the secondary 63 of the transformer is connected by a conductor 97 with the terminal post 67 to which the conductor 70 is connected. Connected with the terminal post 66 is a conductor 98 which connects with one spring arm 85, and connected with the terminal post 68 is a similar conductor 99 connected with the other spring arm 85. The spring arms 92 are connected by a conductor 100 with a terminal post 101, while connected with the contacts 89 are conductors 102 and 103 connected respectively with the terminals 104 and 105. The above described conductors 32, 33 and 34 are connected with the binding posts 104, 101 and 105 respectively.

As mentioned above, the entire apparatus is intended to be responsive to a thermostat located in a room or other place to be heated, this thermostate being indicated rather diagrammatically at 106 and being shown as comprising a panel 107 on which is mounted a thermostatically movable arm 108 adapted to engage either of a pair of contacts 109 and 110 to which are connected, respectively, the conductors 69 and 71. The arm itself 108 has connected therewith the conductor 70 and is here represented as of the spiral type, it being quite apparent that when the temperature within the room where the thermostat is located rises beyond a certain extent the increase in the length of the spiral will cause the arm 108 to move to the right, it being equally clear that when the temperature is reduced so that the spiral shortens the arm 108 will move in the other direction.

Assuming that the parts are in the position shown in the drawings, that is to say assuming that the temperature in a room has exceeded a certain amount so that the thermostat arm 108 is in engagement with the contact 109, it will be apparent that current induced in the secondary coil 63 of the transformer 57 will pass from the terminal post 65, through the conductor 70, thermostat 108, contact 109, conductor 69, terminal post 66, conductor 98, and to the contact 85 which at this time is out of engagement with the lateral extension 86 of the contact 87 so that the circuit will be broken. However in view of the fact that when the electro-magnets 75 and 76 were previously energized the arm 74 was attracted and held by the latch 81, it is clear that the arm 74 and supporting member 73 will be in such position that the left contact arm 92 will have its contact 91 in engagement with the contact 90 at the left of Figure 3 so that current sent from the line conductors through the conductor 26 will pass through the terminal member 24, conductor 49, fuse 40, conductor 51, left electro-magnet 18, to the switch device 42 which is then opened so that no current will flow, while at the same time the lever arm 15 in Figure 1 will remain in its left position maintaining its register plate 11 in closed position so that no heat may escape from the enclosed radiator into the room where the thermostat 106 is located. Assuming that the temperature then drops, the operation is as follows: When the spiral at the end of the thermostat arm 108 contracts, the arm 108 will move out of engagement with the contact 109 and will move into engagement with the contact 110. When this occurs the current induced in the secondary 63 of the transformer 57 will pass from the terminal post 65, through the conductor 70, through the thermostat arm 108, contact 110, conductor 71, terminal post 68, conductor 99, right spring arm 85, right contact 87, right conductor 94, the right electro-magnet 75, and of course the right electro-magnet 76 which is in parallel therewith, conductor 93, back to the terminal post 64 at the other end of the secondary coil 63 of the transformer. When this occurs, it is apparent that the energization of the electro-magnet 76 will attract the armature 77 against the resistant of the right spring 80 so that the keeper 81 on the right latch arm 78 will be moved out of engagement with the free end of the armature arm 74. The current flows from the right electro-magnet 75 through the conductor 93 to the terminal post 64 of the secondary coil 63 of the transformer, thus making a complete circuit. After the electro-magnet 76 has attracted the right armature arm 77 of the latch device 78 so that the free end of the armature arm 74 is released, it is apparent that the magnetism in the electro-magnet 75 will attract the arm 74 which, in moving, will ride under the inclined surface 82 of the keeper carried by the left latch arm 78, the free end of the armature arm 74 riding along the inclined surface 82 of the keeper and catching behind the shoulder 83 thereon. When the armature arm 74 and of course the member 73, move to the right, it is apparent that the right screw 88 engaging against the free end of the right hand spring arm 85 will disengage the latter from the projection 86 of the right hand contact 87, thus breaking the circuit through the right hand electro-magnet 75 and the electro-magnet 76 so that no current will be wasted. Of course the armature arm 74 will then remain in this right hand position owing to the engagement of its free end with the retainer or keeper 81 on the left latch arm 78. When the armature arm 74 and member 73 swing to the right as indicated it is clear that the right contact arm 92 will be in such position that the contact 91 thereon will engage the right contact 90, thereby closing the circuit between the conductor 33, terminal post 101, conductor 100, right spring arm 92, contact 91, contact 90, right contact 89, conductor 103, terminal post 105, conductor 34, terminal post 31, conductor 54, the spring arm 44 of the right switch device 43, lateral extension 47 of the right contact 46, conductor 52, electro-magnets 18, conductor 51, clip 37, fuse 40, clip 36, conductor 49, terminal block 24, conductor 26, back to the line. This energization of the right electro-magnet 18 causes the right armature 19 to be attracted carrying with it, by virtue of the bridge piece 21 and pivot 22, the lever 15 which will then slide the register plate 11 to the right for opening or at least partially uncovering whatever openings may be provided in the enclosure surrounding the radiator.

It will be seen that only a very light current passes through the thermostat device 106 and that this very light current also passing through the electro-magnets 75 and 76 operates by the means disclosed, to move the members 74 and 73 in such manner as to control a much heavier current which is supplied to the actuating device shown in Figure 1, this actuating device operating the register, valve, damper, shutter or any other equivalent control device which might be provided in association with a heating apparatus, oil burner, radiator device or the like. When the thermostat arm 108 again swings into engagement with the contact 109, a corresponding circuit is closed through the left hand electro-magnets 75 and 76 for drawing the armature arm 74 to the left as shown in Figure 3, whereupon the circuit will be closed through the left contact 89 and contacts 90 and 91 for causing energization of the left coil 18 shown in Figure 1 for returning the arm 15, and consequently the register plate 11 to the position shown at the left of Figure 1. This action is entirely automatic and attention is invited to the fact that only a very light current drawn from the transformer 57 passes through the thermostatic device 106 for the purpose of operating the relay shown in Figures 3 and 4, this relay in turn controlling a much heavier current which is fed to the electro-magnetic operating device shown in Figure 1. By virtue of this particular arrangement it is clear that there is never any heavy current passing through delicate portions of the apparatus, with the resultant possibility of burning the contact. By using only this light current it is quite apparent that the contacts will be safe at all times and it will be capable of prolonged use.

From the foregoing descriptions and a study of the drawings it will be apparent that I have thus provided an extremely simple and automatically controlled device in the nature of a relay and electro-magnetic operating means, provision being made to take care of all constituencies so far as regards necessary adjustments to take care of varying conditions. It is really thought from the foregoing that the construction, operation and advantages should be readily apparent to one skilled in the art without further explanation.

While I have shown and described the preferred embodiment of the invention it should of course be understood that I reserve the right to make all such changes in the details of construction and the arrangement and combination of parts as will not depart from the spirit of the invention or the scope of the subjoined claims.

Having thus described my invention I claim:

1. Means for operating a control element of a heating mechanism, comprising a thermostat embodying fixed and movable contacts, a relay operated by said thermostatic device, and an electro-magnetic apparatus responsive to the relay comprising a pivoted arm connected with the control element of the heating mechanism, armatures pivotally mounted at opposite sides of said arm, a bridge pivotally mounted on said arm and having its extremities pivotally connected with the free ends of the armatures, electro-magnets located at opposite sides of the arm in position to attract the armatures, a current supply connected with the electro-magnets, and a pair of circuit breakers connected in series with the respective electro-magnets and operatively connected with the armatures for actuation by the same on attraction by the electro-magnets.

2. Means for operating a control element of a heating mechanism, comprising a thermostat switch, a relay device connected in circuit with said thermostatic switch and including contact devices connected with a source of current, and an operating device for the elements of the heating mechanism comprising a pivoted arm, pivoted armatures located at opposite sides of the arm, a bridge pivotally mounted on the arm and having its extremities pivotally connected with the free ends of the armatures, electro-magnets located at opposite sides of the arm in position to attract the respective armatures, and automatic circuit breakers operatively connected with the armatures and operable by movement of said arm and connected in series with the respective electro-magnets.

3. Means for operating a control element of a heating mechanism, comprising a thermostatic switch, a relay device comprising a pivoted arm carrying an armature, electro-magnets located at opposite sides of said arm in position to attract the same, other electro-magnets connected in circuit with said first named electro-magnets, latch devices cooperating with said arm, said latch devices including armatures positioned to be attracted by the second named electro-magnets, automatic circuit breakers connected in series with the respective electro-magnets and operable by movement of said arm, and a pair of switches operable by movement of said arm for closing a separate circuit.

4. Means for controlling the position of an element in a heating mechanism, comprising the combination of a thermostat responsive to room temperature, a relay device responsive to the thermostat and including a movable arm carrying an armature, electro-magnets positioned at opposite sides of the armature for attracting the same, other electro-magnets connected in circuit with the first named electro-magnets, latch devices positioned to be attracted by the second named electro-magnets and carrying means engageable with the armatures for maintaining the same in a selected position, circuit breakers carried by said arm for breaking the circuit through the first and second named electro-magnets when the armature is in latched position, and switch devices operated by said arm for controlling a final operating circuit.

5. Means for controlling the position of an element in a heating mechanism, comprising the combination of a thermostat responsive to room temperature, a relay device responsive to the thermostat and including a movable arm carrying an armature, electro-magnets positioned at opposite sides of the armature for attracting the same, other electro-magnets connected in circuit with the first named electro-magnets, latch devices positioned to be attracted by the second named electro-magnets and carrying means engageable with the armatures for maintaining the same in a selected position, circuit breakers carried by said arm for breaking the circuit through the first and second named electro-magnets when the armature is in latched position, and switch devices operated by said arm for controlling a final operating circuit including a pivoted arm connected with the heating control element, electro-magnets located at opposite sides of said last named arm, armatures positioned to be attracted by said last named electro-magnets and connected with said arm, circuit breakers carried by said last named arm and connected in series with the last named electro-magnets.

6. Means for controlling the position of an element in a heating mechanism, comprising a thermostat switch responsive to room temperature, a transformer connected with a lighting current supply and including a secondary coil, a relay device connected with said secondary coil and with said thermostatic switch device and including a movable arm carrying an armature, electro-magnets located at opposite sides of the armature, other electro-magnets located adjacent and connected in circuit with said first named electro-magnet, latch members pivotally mounted and including armature portions located in position to be attracted by the second named electro-magnet and carrying latch means engageable with said armature, circuit breakers operated by said arm and connected in series with the first named electro-magnets for deenergizing the same subsequent to attraction of the armature toward one of the first named electro-magnets or the other, switch devices including stationary contacts and movable contacts carried by said arm engageable with the stationary contacts when the armature is attracted by one of the first named electro-magnets or the other, in combination with a pivoted member having an armature, electro-magnets located at opposite sides of the second named armature in position to attract the same, electro-magnets for operating said last named arm, circuit breakers located in series with said last named electro-magnets.

In testimony whereof I affix my signature.

JAMES J. MUNDORF.